United States Patent
Leung

(10) Patent No.: US 8,393,210 B2
(45) Date of Patent: Mar. 12, 2013

(54) ROTATION SENSING APPARATUS AND METHODS

(75) Inventor: Albert M. Leung, Burnaby (CA)

(73) Assignee: Simon Fraser University, Burnaby (CA)

(*) Notice: Subject to any disclaimer, the term of this patent is extended or adjusted under 35 U.S.C. 154(b) by 314 days.

(21) Appl. No.: 12/837,229

(22) Filed: Jul. 15, 2010

(65) Prior Publication Data
US 2011/0011181 A1 Jan. 20, 2011

Related U.S. Application Data

(60) Provisional application No. 61/226,160, filed on Jul. 16, 2009.

(51) Int. Cl.
*G01P 9/00* (2006.01)
(52) U.S. Cl. .................. 73/504.05; 73/504.06
(58) Field of Classification Search ........... 73/504.03, 73/504.05, 504.06, 504.17, 497, 514.05, 73/514.06, 514.07, 514.09, 514.1, 514.11, 73/514.12, 514.13
See application file for complete search history.

(56) References Cited

U.S. PATENT DOCUMENTS

| | | | |
|---|---|---|---|
| 1,841,607 A | 1/1932 | Kollsman | |
| 4,020,700 A | 5/1977 | Lopiccolo et al. | |
| 4,594,894 A * | 6/1986 | Moffatt | 73/504.06 |
| 4,622,858 A * | 11/1986 | Mizerak | 73/861.357 |
| 5,012,676 A * | 5/1991 | Takahashi et al. | 73/497 |
| 5,567,877 A * | 10/1996 | Nishio et al. | 73/504.06 |
| 5,780,738 A * | 7/1998 | Saunders | 73/504.06 |
| 7,730,781 B2 * | 6/2010 | Zhang et al. | 73/504.03 |
| 8,146,423 B2 * | 4/2012 | Cai et al. | 73/504.05 |

FOREIGN PATENT DOCUMENTS

WO 2008/052306 A1 5/2008

OTHER PUBLICATIONS

Greiff, et al., "Silicon monolithic micromechanical gyroscope," Digest of Technical Papers of the International Conference on Solid State Sensors and Actuators, Transducers '91, Jun. 1991, pp. 966-968.
Dau, V. T. et al. "Development of a dual-axis thermal convective gas gyroscope," Journal of Micromechanics and Microengineering, vol. 16, No. 7, pp. 1301-1306, Jul. 2006.
Dau, V. T. et al. "A single-axis thermal convective gas gyroscope," Sensors and Materials, vol. 17, pp. 453-463, 2005.

* cited by examiner

*Primary Examiner* — Helen C. Kwok
(74) *Attorney, Agent, or Firm* — Oyen Wiggs Green & Mutala LLP

(57) ABSTRACT

Angular rate sensors cause a stream of fluid to flow by heating the fluid. A trajectory of the stream of fluid is deflected by Coriolis forces. Apparatus according to some embodiments provides two heaters spaced apart along a channel. A stream of gas can be made to flow along the channel by operating one of the heaters. The flow can be periodically reversed by alternating operation of the heaters. Temperature sensors may be applied to detect deflection of the flowing gas. Angular rate sensors may be fabricated inexpensively by micromachining techniques.

20 Claims, 17 Drawing Sheets

ROTATION SENSING APPARATUS AND METHODS

CROSS-REFERENCE TO RELATED APPLICATION

This application claims the benefit under 35 U.S.C. §119 of U.S. patent application No. 61/226,160 filed on 16 Jul. 2009 and entitled ROTATION SENSING APPARATUS AND METHODS which is hereby incorporated herein by reference in its entirety for all purposes.

TECHNICAL FIELD

The invention relates to apparatus and methods for detecting rotation. Embodiments of the invention provide angular rate sensors (also known as 'gyros') that may be applied in a wide range of applications.

BACKGROUND

Angular rate measurement is required in many applications such as navigation, vehicle stability control, GPS back-up systems, virtual reality, motion compensation in cameras and camcorders, consumer electronic devices (such as handheld game controllers, cellular telephones, portable computers) and the like. Current angular rate sensors (commonly called 'gyros') are undesirably expensive and/or undesirably large for some applications particularly applications in consumer devices.

Several companies currently offer micromachined gyros that employ resonating structures to detect angular rate. Such gyros are fabricated in dedicated processes with special packaging. Extremely high control of proof mass dimensions is required to achieve acceptable device performance. Such gyros tend to be too expensive to incorporate in many devices which could benefit from lower-cost gyros.

Miniaturized quartz gyroscopes based on tuning-forks were invented in the 1950's.

P. Kollsman, U.S. Pat. No. 1,841,607 entitled "Turn indicator," discloses an apparatus for measuring angular rate by detecting deviation of the path of a moving fluid resulted from Coriolis acceleration.

P. Greiff, et al., "Silicon monolithic micromechanical gyroscope," in Digest of Technical Papers of the International Conference on Solid State Sensors and Actuators, Transducers '91, June 1991, pp. 966-968 describes a batch fabricated silicon micromachined angular rate gyro.

M. T. Lopiccolo, et al U.S. Pat. No. 4,020,700, entitled "Unitary fluidic angular rate sensor," disclose a gyro that has a miniature electric pump for moving fluid and temperature sensors for detecting fluid stream position.

V. T. Dau, et al. "Development of a dual-axis thermal convective gas gyroscope," Journal of Micromechanics and Microengineering, vol. 16, no. 7, pp. 1301-1306, July 2006 and D. van Thanh, et al. "A single-axis thermal convective gas gyroscope," Sensors and Materials, vol. 17, pp. 453-463, 2005 describe fluidic angular rate sensors based on forced convection produced by a piezoelectric pump.

There is a need for cost-effective rotation sensors. Such sensors may have application, for example, in: electronic games and game controllers; hand-held electronic devices; vehicular control systems and the like.

SUMMARY OF THE INVENTION

The invention has a number of aspects. The invention provides angular rate sensors, angular rate detectors and methods for detecting and/or measuring angular rate and/or linear acceleration.

One aspect of the invention provides sensors for detecting angular motion. Such sensors may comprise a channel, first and second fluid drivers located at first and second ends of the channel, and a driving circuit operative to actuate the first and second fluid drivers. The driving circuit is configured to drive the fluid drivers to, in alternation, drive a first stream of fluid to flow along the channel in a first direction and drive a second stream of fluid to flow along the channel in a second direction opposite to the first direction. A trajectory sensor is configured to detect variations in trajectories of the first and second streams of fluid. The variations may arise at least in part from Coriolis forces acting on the streams of flowing fluid.

In some embodiments trajectory sensor comprises first and second temperature sensors on opposing sides of the channel and the first and second streams are directed to flow between the first and second temperature sensors. The temperature sensors may comprise temperature sensors of first and second mass flow sensors.

Separate sets of the first and second temperature sensors may be provided at either end of the channel. In some embodiments the first and second fluid drivers comprise first and second heaters and/or first and second diaphragms or other deflectable members. A control circuit may be provided to operate the first and second fluid drivers in alternation.

In some embodiments the channel is filled with a gas having a molecular weight of at least 100. In some embodiments the gas comprises $SF_6$.

Another aspect of the invention provides methods for detecting angular rate. The methods comprise generating a first stream of flowing fluid by heating the fluid at a first location; and measuring a deviation of a trajectory of the stream. In some embodiments measuring the deviation of the trajectory of the stream comprises directing the stream to flow between first and second sensors and determining a first difference between outputs of the first and second sensors. The first and second sensors may comprise temperature sensors. In some embodiments the methods comprise generating a second stream of flowing fluid by heating the fluid at a second location spaced apart from the first location, allowing the second stream to flow between the first and second sensors, determining a second difference between outputs of the first and second sensors, and, determining a difference between the first difference and the second difference.

Another aspect of the invention provides methods for detecting angular rate. The methods comprise, in alternation, generating a first stream of fluid flowing in a channel in a first direction and generating a second stream of fluid flowing in the channel in a second direction opposed to the first direction. The methods measure deviations in trajectories of the first and second streams. The deviations may result, at least in part from Coriolis forces. The methods combine the deviations to provide a measure of the angular rate and/or a measure of linear acceleration. Generating the first and second streams respectively comprise one or more of operating first and second heaters and operating first and second fluid displacement devices. The fluid displacement devices may, for example, comprise diaphragms driven by electromechanical actuators such as piezoelectric or electrostatic actuators.

Further aspects of the invention and features of specific embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Embodiments of the invention apply the fact that a flowing fluid in a rotating frame of reference experiences Coriolis forces. The Coriolis forces depend upon the rotation and affect the trajectory of the flowing fluid. Rotations can be measured by monitoring the effects of such Coriolis forces on the trajectory of the flowing fluid.

Figure 1:
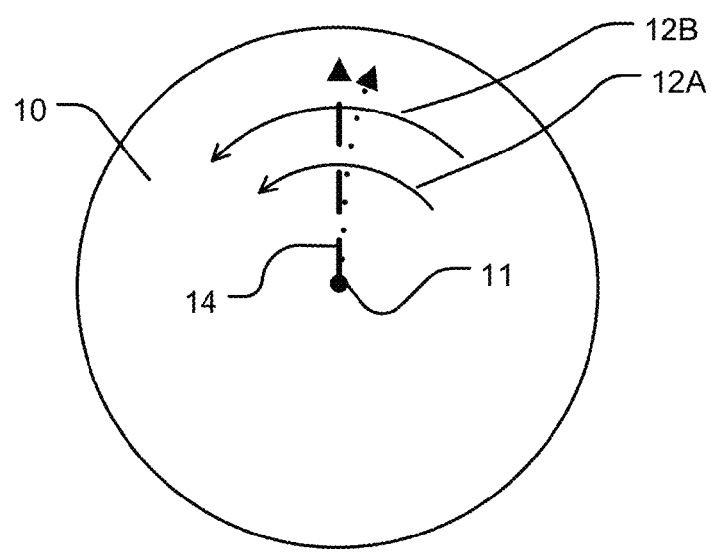
FIGS. 1 and 1A are schematic drawings illustrating the effects of Coriolis forces on streams of fluid in rotating frames of reference.

FIG. 1 shows a turntable or carousel 10 which illustrates the origin of Coriolis forces. Carousel 10 is rotating about a centre of rotation at an origin 11. The rotation is counter clockwise from the viewpoint of FIG. 1 as illustrated by arrows 12A and 12B. A source of fluid at origin 11 emits a stream of fluid 14 in a radial direction. When viewed from a stationary frame of reference, stream 14 travels in a straight line from origin 11 (neglecting any interaction between stream 14 and the moving surface of carousel 10).

From the point of view of an observer or apparatus rotating with carousel 10 (to whom carousel 10 represents a fixed frame of reference) and looking along the flow of fluid in the direction of flow from the origin the trajectory of the stream of fluid appears to deviate to the right as if affected by a force, the Coriolis force, oriented perpendicular to the velocity of fluid stream 14 in the rotating frame of reference.

Figure 1A:
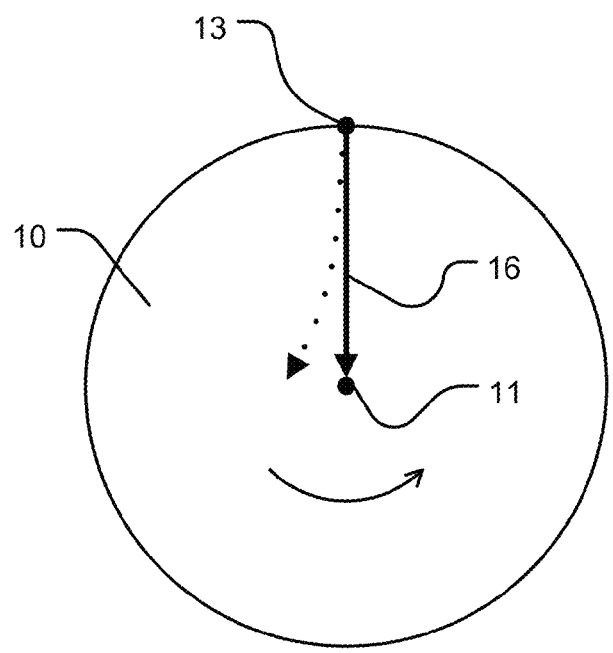

FIG. 1A shows a turntable or carousel 10 like that of FIG. 1 supporting a fluid source 13. Fluid source 13 emits a stream of fluid in a radial direction toward origin 11 as indicated by arrow 16. Due to the horizontal velocity of fluid source 13, an observer in the rotating frame of reference of carousel 10 would observe the trajectory of the stream of fluid being deflected so that the flow turns to the right (as if affected by a Coriolis force oriented perpendicular to the velocity of the fluid stream 16 as viewed in the rotating frame of reference).

The Coriolis forces illustrated in FIGS. 1 and 1A arise as a result of the rotation of carousel 10. Coriolis forces can affect fluid streams regardless of the particular locations relative to origin 11 at which the fluid streams arise. The fluid source locations in FIGS. 1 and 1A are illustrative only. In a frame of reference rotating counter-clockwise the trajectories of fluid streams are deflected toward the right. In a frame of reference rotating clockwise the trajectories of fluid streams are deflected toward the left.

The magnitude of the Coriolis force is proportional to the speed of rotation about origin 11 and also to the speed of fluid in stream 14. By observing the deviation of the trajectory of stream 14 from a straight line, an observer or apparatus fixed to carousel 10 can determine: whether or not carousel 10 is rotating about origin 11, what is the direction of rotation of carousel 10 (clockwise or anti-clockwise), and how fast is carousel 10 rotating.

Figure 2:
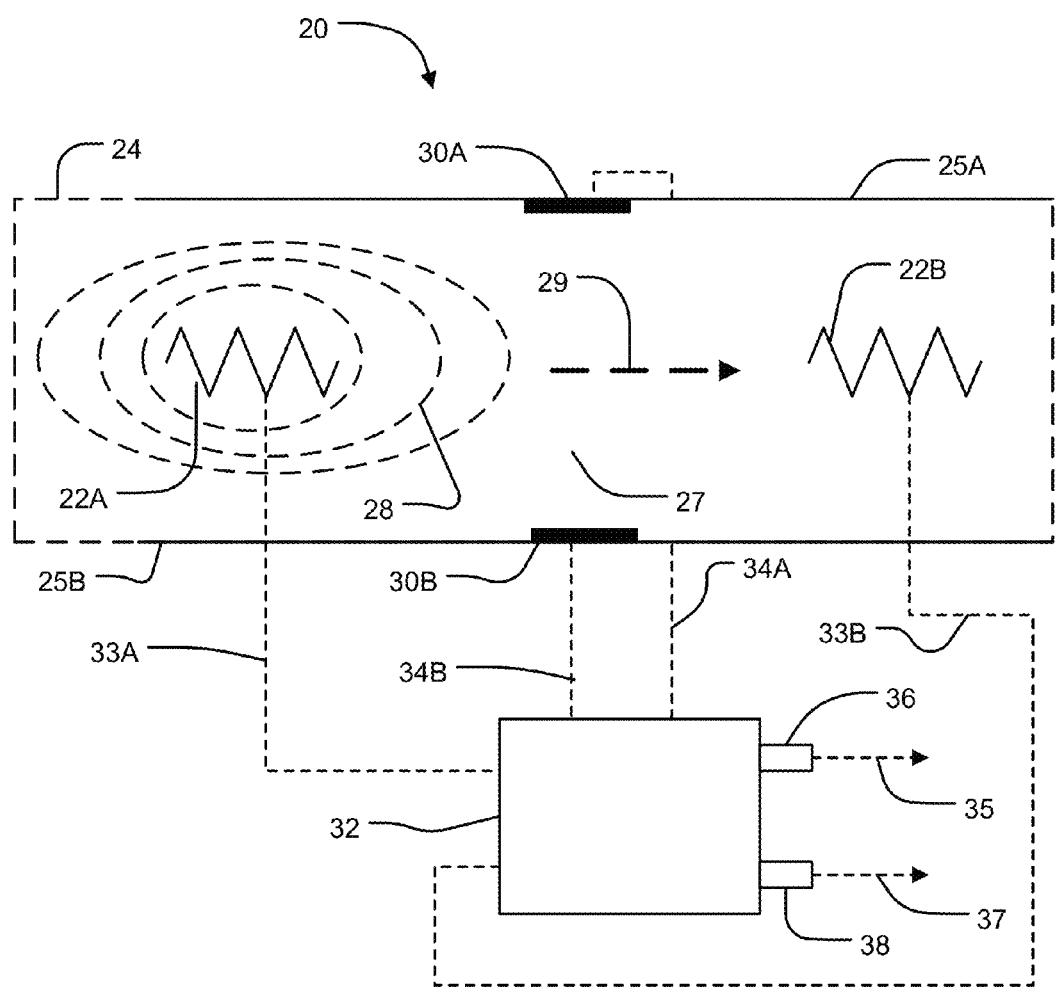
FIG. 2 is a schematic view of a rotation sensing apparatus according to an example embodiment.

FIG. 2 shows schematically a rotation sensing apparatus 20 according to one embodiment of the invention. Apparatus 20 comprises first and second heaters 22A and 22B (collectively heaters 22) that are spaced apart from one another in a confined or partially-confined volume 24. In the illustrated embodiment, volume 24 comprises a channel defined between walls 25A and 25B.

Heaters 22A and 22B are in a fluid medium 27. When one of heaters 22 is operated, as is heater 22A in FIG. 2, heat is transferred to the surrounding fluid 27 with the result that the heated fluid 28 near the operating heater 22 expands. The expansion of heated fluid 28 in volume 24 results in a stream of fluid 29 moving away from the operating heater 22. For the reasons noted above, if apparatus 20 is rotating and a component of the rotation is about an axis that is perpendicular to the direction of stream 29 then the trajectory of stream 29 will be altered from the point of view of apparatus 20. A trajectory sensor 30 (illustrated as comprising parts 30A and 30B) is provided to detect changes in the trajectory of stream 29.

In the illustrated embodiment, apparatus 20 is symmetrical such that heaters 22A and 22B can be operated in alternation to generate a stream of fluid 29 that flows generally in the direction toward heater 22B from heater 22A when heater 22A is operated and generally in an opposite direction toward heater 22A from heater 22B when heater 22B is operated. Trajectory sensor 30 detects changes in the trajectory of the stream of fluid 29 that could result, for example, from rotation of apparatus 20.

The trajectory of stream 29 may be affected by linear accelerations of apparatus 20 as well as by rotations of apparatus 20. However, the direction of displacement of the trajectory of stream 29 in response to a linear acceleration of apparatus 20 will be the same regardless of the direction of stream 29. By contrast, the direction of displacement of the trajectory of stream 29 in response to a rotation of apparatus 20 will be opposite if the direction of flow of stream 29 is reversed. Thus, by additively and/or subtractively combining results from trajectory sensor 30 for different directions of flow of stream 29 one can obtain an output indicative of linear acceleration of apparatus 20 (substantially independent of any rotation of apparatus 20) or an output indicative of rotation of apparatus 20 (substantially independent of any linear accelerations of apparatus 20) or both, or desired combinations thereof.

Trajectory sensor 30 may comprise suitable flow sensors, temperature sensors, or the like which have outputs that vary in response to the degree to which the adjacent fluid 27 is flowing. For example, trajectory sensor 30 may comprise a pair of temperature sensors (illustrated schematically as 30A and 30B) located on either side of stream 29. If stream 29 has a temperature different from ambient temperature and is flowing symmetrically between the temperature sensors then the temperature sensors may both register the same temperature. If stream 29 is deflected so that its trajectory has a component toward one of the temperature sensors and away from the other temperature sensor then the temperature sensors may sense different temperatures. In this case, if the amount of deflection of stream 29 increases (e.g. as a result of an increased angular rate) the magnitude of a temperature difference between the temperature sensors may also increase. Monitoring the difference in temperatures sensed by sensors 30A and 30B can therefore provide a measure of the rotation and/or linear acceleration of apparatus 20.

In some embodiments, sensors 30A and 30B are operated as hot wire type flow sensors. In such embodiments sensors 30A and 30B may comprise conductors heated by passage of an electrical current and located such that the rate of heat loss from the heated conductors increases with the flow of fluid adjoining the sensors. The temperatures of the conductors therefore provide an indication of the rate of flow of the adjoining fluid. The temperatures of the conductors may, for example, be monitored by obtaining a measure of the resistance of the conductors (using the conductors themselves as temperature sensors) or by providing separate temperature sensors. Sensors 30A and 30B may, for example, comprise silicon micromachined mass flow sensors.

In FIG. 2 is schematically illustrated control logic 32 that controls application of driving signals 33A and 33B to heaters 22A and 22B respectively. Control logic 32 also receives temperature signals 34A and 34B (or a signal representing the difference between temperature signals 34A and 34B) from temperature sensors 30A and 30B respectively and processes temperature signals 34A and 34B to yield a rotation output signal 35 presented at an output 36 and optionally also a linear acceleration output signal 37 presented at another output 38.

One advantage of the overall layout of apparatus 20 is that such apparatus may be effectively miniaturized. Further, such miniaturized apparatus may be constructed using suitable micromachining techniques.

Figure 3:
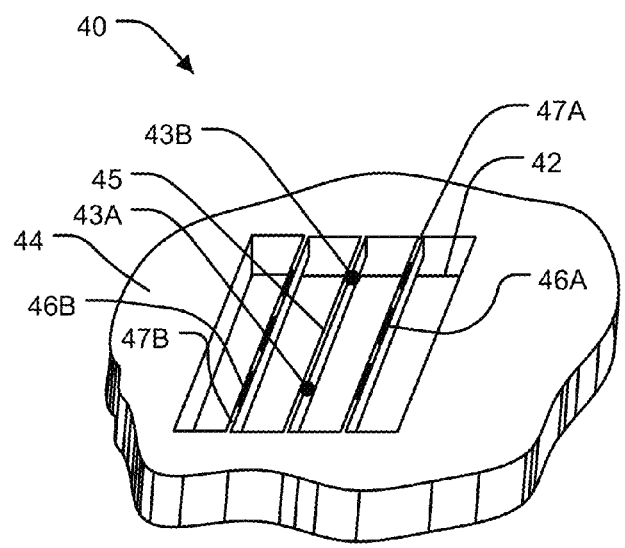
FIG. 3 is a schematic view of an example angular rate sensor apparatus that may be made, for example, by micromachining.

FIG. 3 shows an example rotation sensing apparatus 40 that may be made, for example, by micromachining a suitable substrate such as silicon. Apparatus 40 comprises a cavity 42 in a substrate 44. Heaters 43A and 43B (collectively heaters 43) are supported on a first bridge 45 extending across cavity 42. Temperature sensors 46A and 46B (collectively sensors 46) are supported on bridges 47A and 47B which span cavity 42 on either side of bridge 45. Heaters 43 are located on a line of symmetry between temperature sensors 46A and 46B.

Electrically-conducting pathways to carry electrical signals to/from temperature sensors 46 and heaters 43 may be provided in or on substrate 44. Apparatus 40 may be enclosed within a chip package (not shown).

Figure 4A:
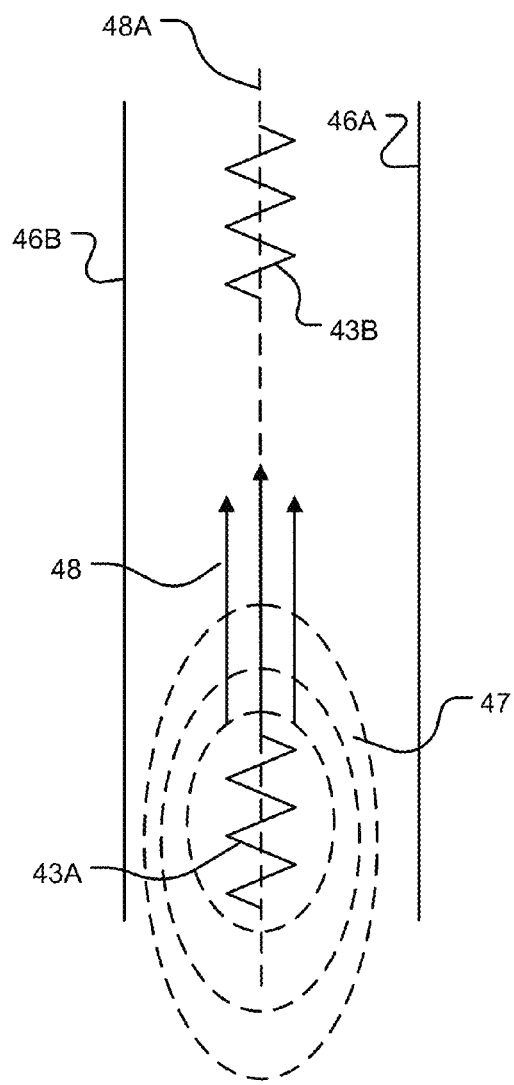
FIGS. 4A and 4B illustrate stages in the operation of the angular rate sensor of FIG. 3.

In operation, heaters 43A and 43B are activated in alternation to move fluid back and forth between them along a channel in cavity 42. A first phase of this operation is illustrated in FIG. 4A. An electrical current is being applied to heat up heater 43A while heater 43B remains at ambient temperature. Fluid in the vicinity 47 of heater 43A is heated and expands. Before thermal equilibrium is reached, this fluid expansion produces a fluid stream 48 moving toward heater 43B.

With no rotation (and no linear acceleration), i.e. angular rate $\Omega=0$, fluid stream 48 moves along a straight path indicated by dotted line 48A that is symmetrically disposed between temperature sensors 46A and 46B. This results in zero differential temperature $\Delta T$ between temperature sensors 46.

Figure 4B:
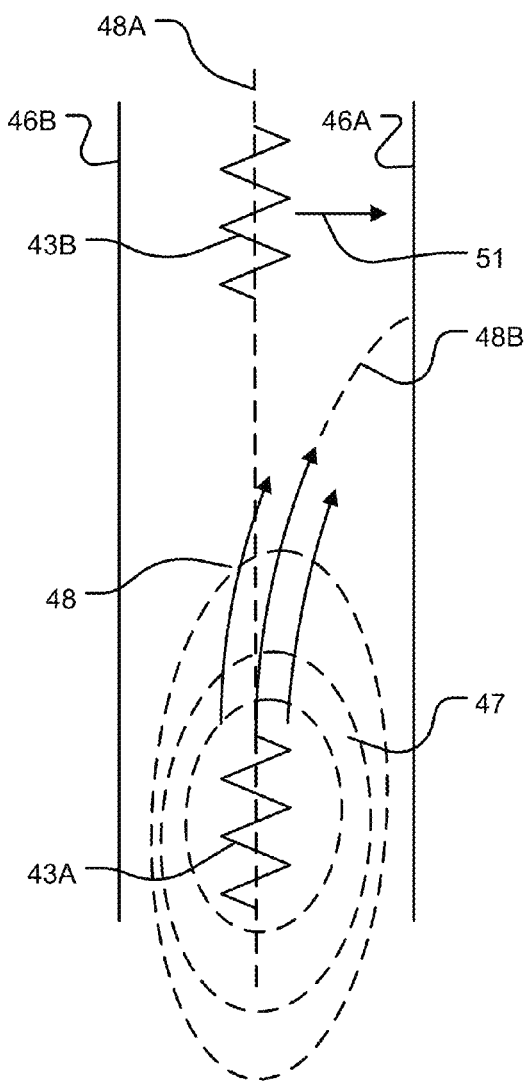

When apparatus 40 is rotating, a Coriolis force acts on fluid stream 48 and causes fluid stream 48 to deviate from the symmetrical path 48A. In the case illustrated in FIG. 4B the rotation is counter-clockwise resulting in a Coriolis force directed as indicated by arrow 51. Reacting to the Coriolis force, fluid stream 48, in which the fluid has a temperature higher than ambient temperature, is deflected toward temperature sensor 46A as illustrated by dotted line 48B. This creates a time dependent positive differential temperature $\Delta T(t)$ given by $\Delta T(t)=T_A(t)-T_B(t)$ where $T_A(t)$ is a temperature sensed by temperature sensor 46A and $T_B(t)$ is a temperature sensed by temperature sensor 46B.

In a second phase of this operation, heater 43B is activated and heater 43A is turned OFF and allowed to cool to ambient temperature. The direction of fluid movement reverses and creates a negative $\Delta T(t)$. Using proper detection timing synchronous to the switching of heaters 43A and 43B an output signal proportional to the angular rate and direction can be obtained. This is illustrated in FIG. 5.

Figure 5:
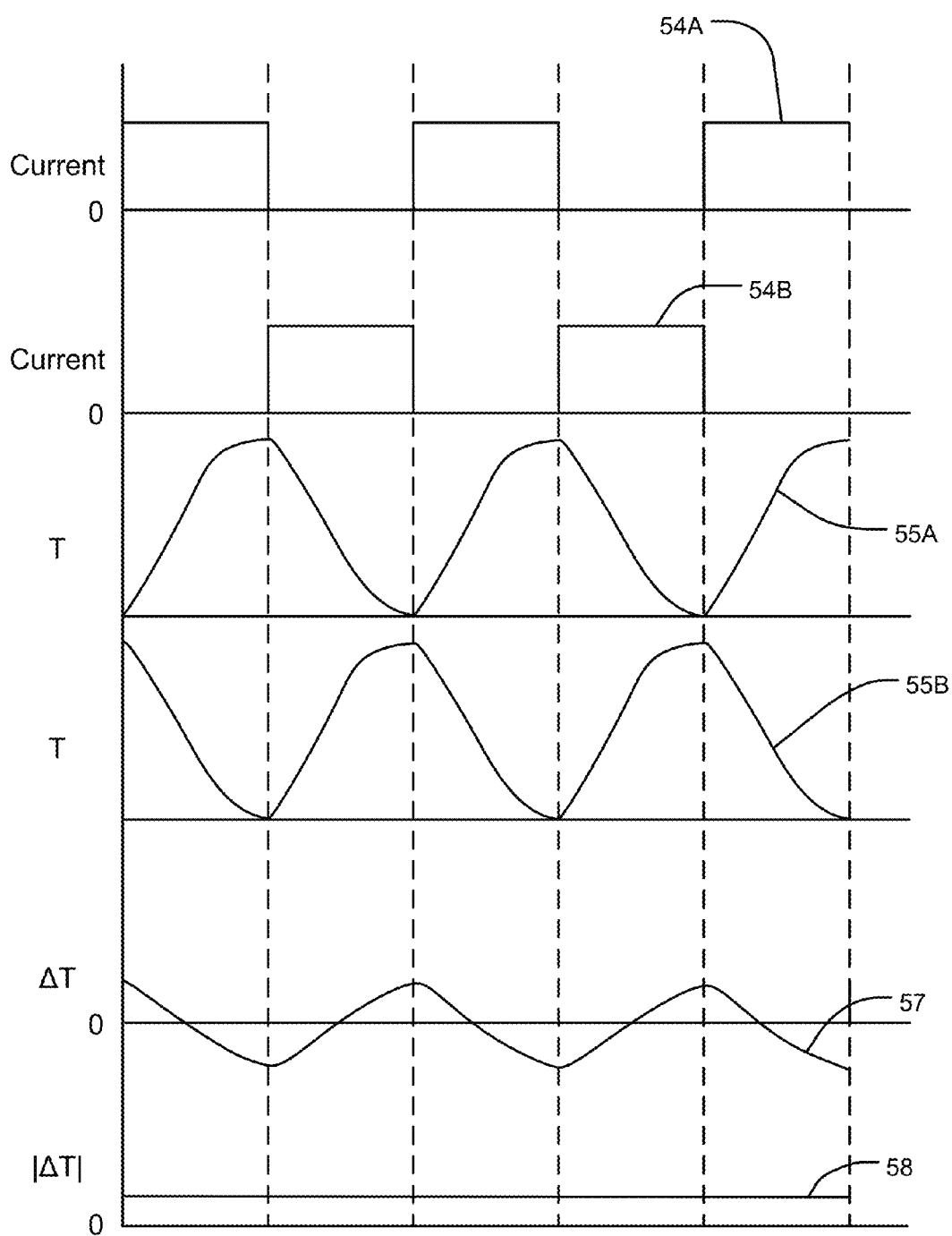
FIGS. 5 and 5A are plots illustrating the time variation of various signals that may be provided in the operation of an angular rate sensor.

FIG. 5 is a graph showing variations in time of a number of quantities (all expressed in arbitrary units). Curves 54A and 54B show current driving heaters 43A and 43B respectively. Curves 55A and 55B show temperatures of heaters 43A and 43B respectively. Curve 57 illustrates a difference between the temperatures measured by temperature sensors 46A and 46B and curve 58 illustrates an output signal obtained by rectifying and filtering the signal represented by curve 57.

Figure 5A:
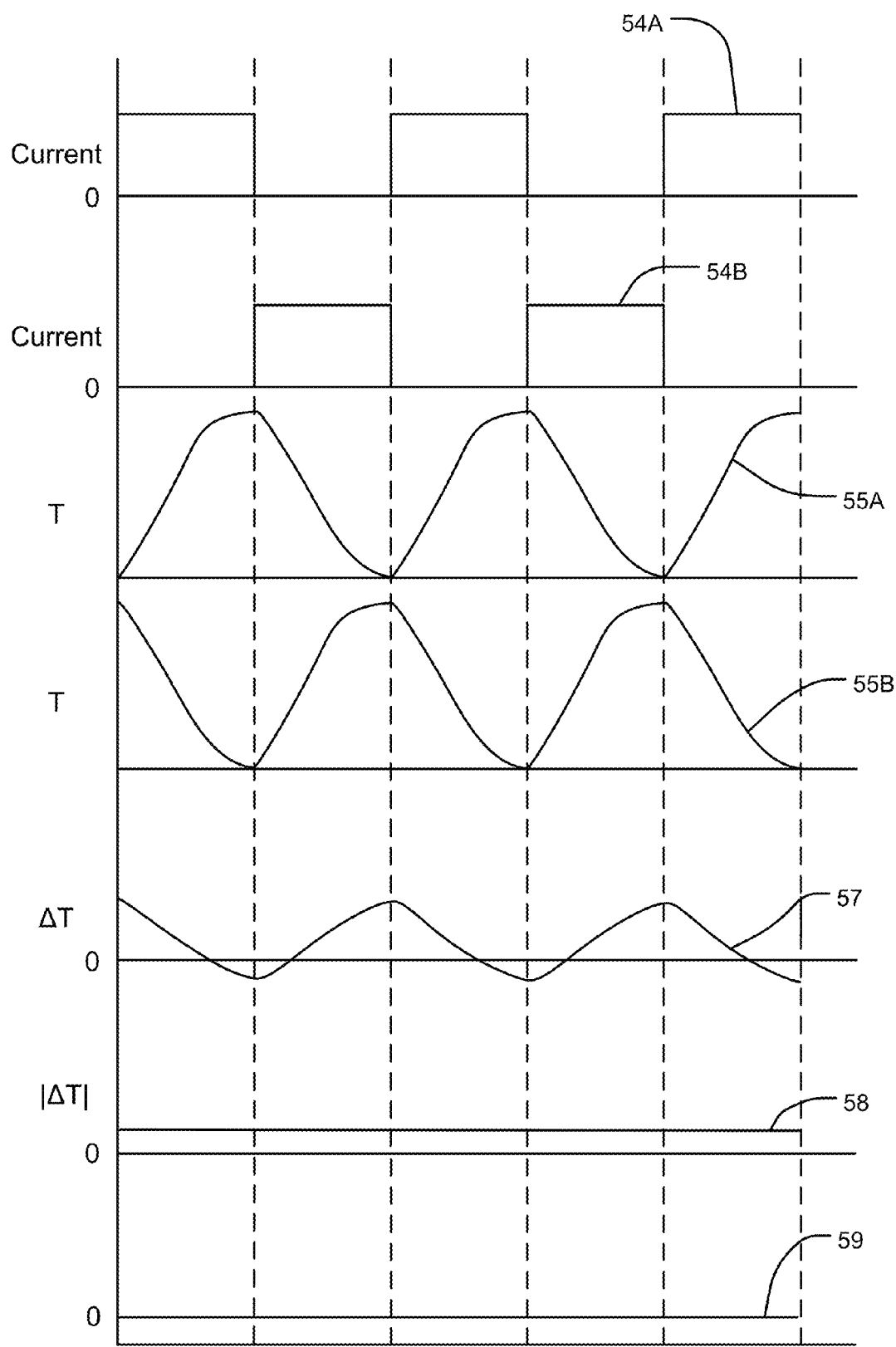

FIG. 5A is similar to FIG. 5 but illustrates the case where there is a linear acceleration that causes fluid stream 48 to be deflected toward temperature sensor 46A (regardless of the direction of flow). The result of this linear acceleration is that curve 57 is offset. However, the output signal of curve 58 is substantially unaffected. Also shown in FIG. 5A is a curve 59 representing an output signal obtained by time averaging the signal represented by curve 57 without rectification. This output signal varies with the magnitude of the component of linear acceleration directed transversely to fluid stream 48.

Figure 6:
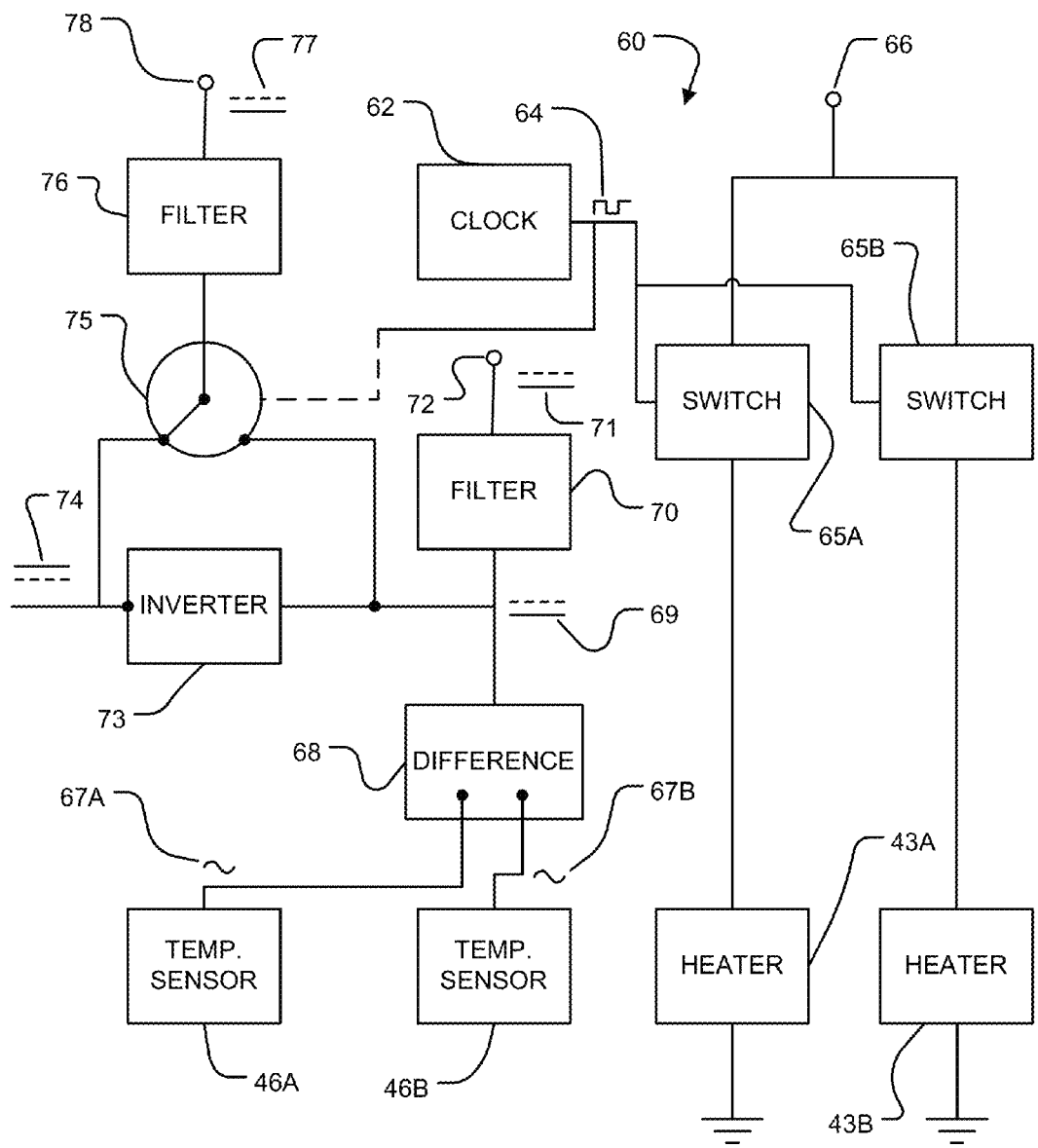
FIG. 6 illustrates an example control circuit.

FIG. 6 illustrates a simple control circuit 60 that could optionally be fabricated on a substrate in which a rotation detection apparatus is formed (on-chip controller). A control circuit such as circuit 60 or parts thereof may be provided off-chip in the alternative. Circuit 60 comprises a clock 62 configured to generate a timing signal 64. Switches 65A and 65B controlled by timing signal 64 are respectively connected to switch ON and OFF a supply of electrical power from a power input 66 to heaters 43A and 43B. Switch 65A is ON when timing signal 64 is high and OFF otherwise. Switch 65B is OFF when timing signal 64 is high and ON otherwise.

Temperature signals 67A and 67B from temperature sensors 46A and 46B respectively are provided to an input of a difference circuit 68. A difference signal 69 is filtered at a filter 70 to yield a linear acceleration signal 71 at an output 72. Difference signal 69 is connected to an inverter 73 that yields an inverted difference signal 74. A switch 75 controlled by clock signal 64 connects either difference signal 69 or inverted difference signal 74 to the input of a filter 76 depending on the state of clock signal 64. Filter 76 yields an angular rate signal 77 at an output 78.

Heaters for use in embodiments may have a variety of forms. For example, in some embodiments the heaters comprise traces patterned on semiconductor substrates. The traces may be made of metallic materials such as thin layers of copper or aluminum, thin layers of nichrome or the like, semiconductor materials such as doped silicon or polycrystalline silicon, electrically-resistive organic materials, or the like.

In some embodiments, the maximum temperatures at which heaters are operated are up to approximately 150° C. In embodiments comprising active electronic components in proximity to the heaters the maximum temperatures may be kept below 100° C. or so to avoid reducing the life expectancies of the active electronic devices through high temperatures. Temperatures of 100° C. or lower are sufficient for a wide range of applications. The operating temperatures of heaters may be selected based upon characteristics of the materials used to make apparatus as described herein and characteristics of the fluid used.

The rate at which the apparatus is cycled (e.g. the period of the clock signal 64 of the control circuit 60 of FIG. 6) may be varied. It is generally desirable that switching between the heaters is performed at a frequency such that the periods are short relative to the time scales on which linear acceleration applied to the apparatus is expected to change. In some embodiments the frequency may be on the order of 40 or 50 Hz to 100 or 200 Hz or so, for example. Lower frequencies may be used in some embodiments. In some embodiments, the frequency may be varied automatically. For example, in the absence of a detected linear acceleration the frequency may be kept relatively low to conserve power. If a linear acceleration is detected, the frequency may be automatically increased. One effect of increasing the frequency is improved isolation of the angular rate output from linear accelerations.

Figure 7:
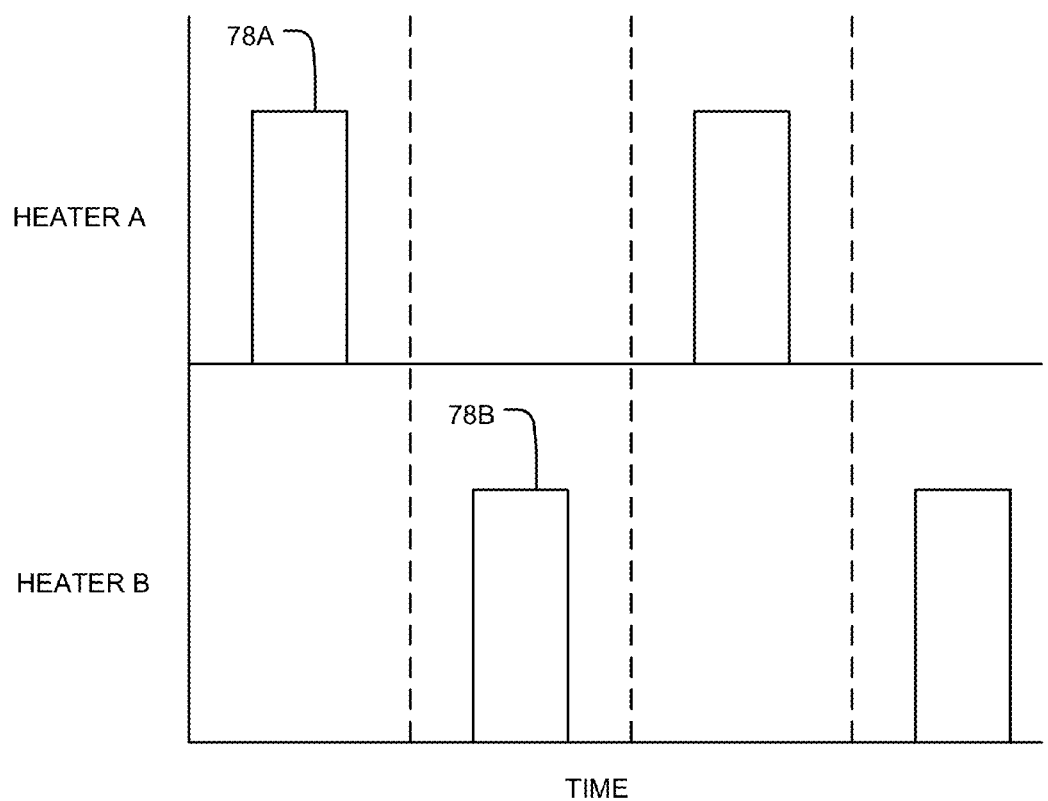
FIG. 7 is a plot illustrating a possible timing for switching two heaters between ON and OFF states.

It is not mandatory that each heater be turned ON simultaneously with the other heater being turned OFF. For example, in some embodiments there are pauses during which neither of the heaters is on after each heater is turned OFF. This is illustrated in FIG. 7 which shows curves 78A and 78B representing the timing of switching two heaters between their ON and OFF states. In some embodiments, the heaters are driven such that first and second heaters are operated in sequence to generate opposing flows of fluid which can be used to measure angular rate, as discussed above, and then there is a relatively long pause during which the apparatus may be idle.

In other embodiments, one heater may be turned ON shortly before the other heater is turned OFF. Such embodiments may be beneficial for maintaining higher switching frequencies in the case that the heaters have enough thermal mass that they take a significant time to heat to their operating temperature.

Figure 8A:
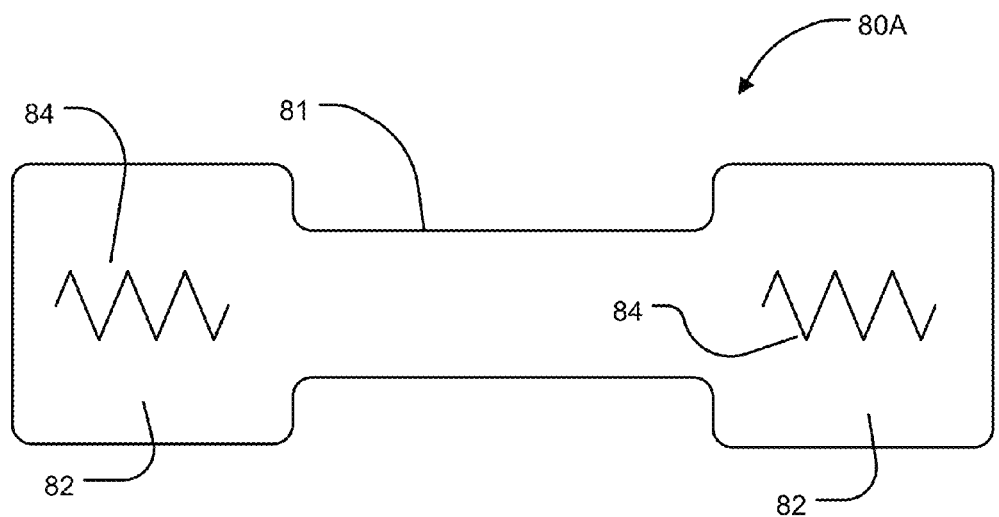
FIGS. 8A and 8B show examples of possible channel configurations.
Figure 8B:
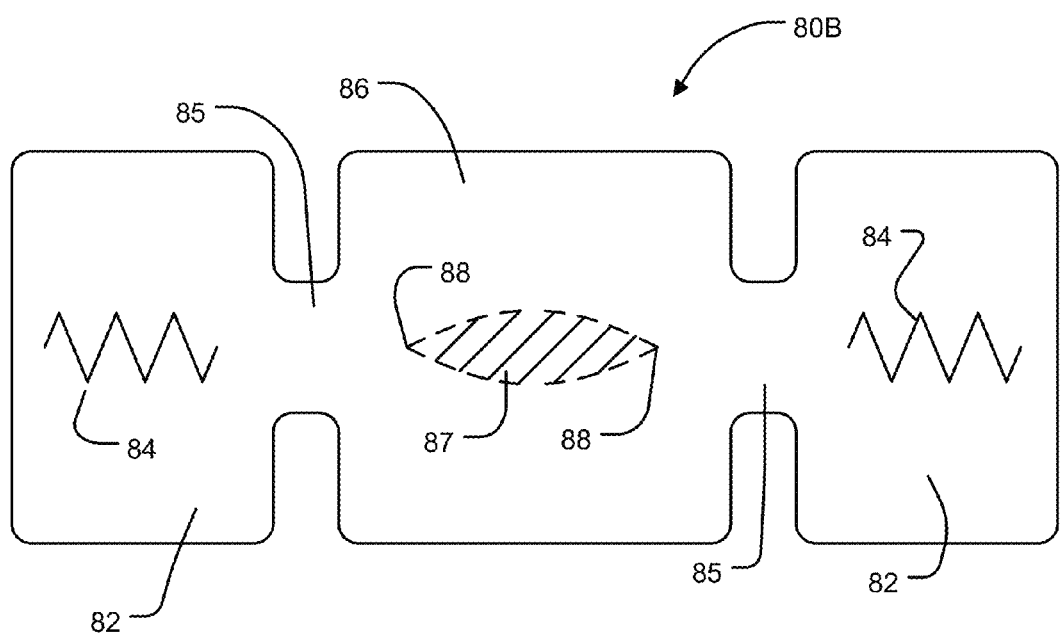

The sensitivity of an angular rate detector as described herein typically increases with increased fluid velocity. The shaping of the channel in which the fluid flows can affect the fluid velocity. In some embodiments, the channel provides one or more constrictions between the heaters. FIGS. 8A and 8B show examples of possible channel configurations 80A and 80B for such embodiments. Channel 80A of FIG. 8A has a narrowed region 81 extending between wider areas 82 surrounding heaters 84. Channel 80B of FIG. 8B has narrow regions 85 on either side of a wider central area 86. Heaters 84 are located in wider areas 82 at either end of channel 80B. FIG. 8B also shows an optional flow divider 87 having sharp edges 88 at either end. A flow divider may enhance the temperature difference resulting from a given angular rotation or linear acceleration.

Figure 9:
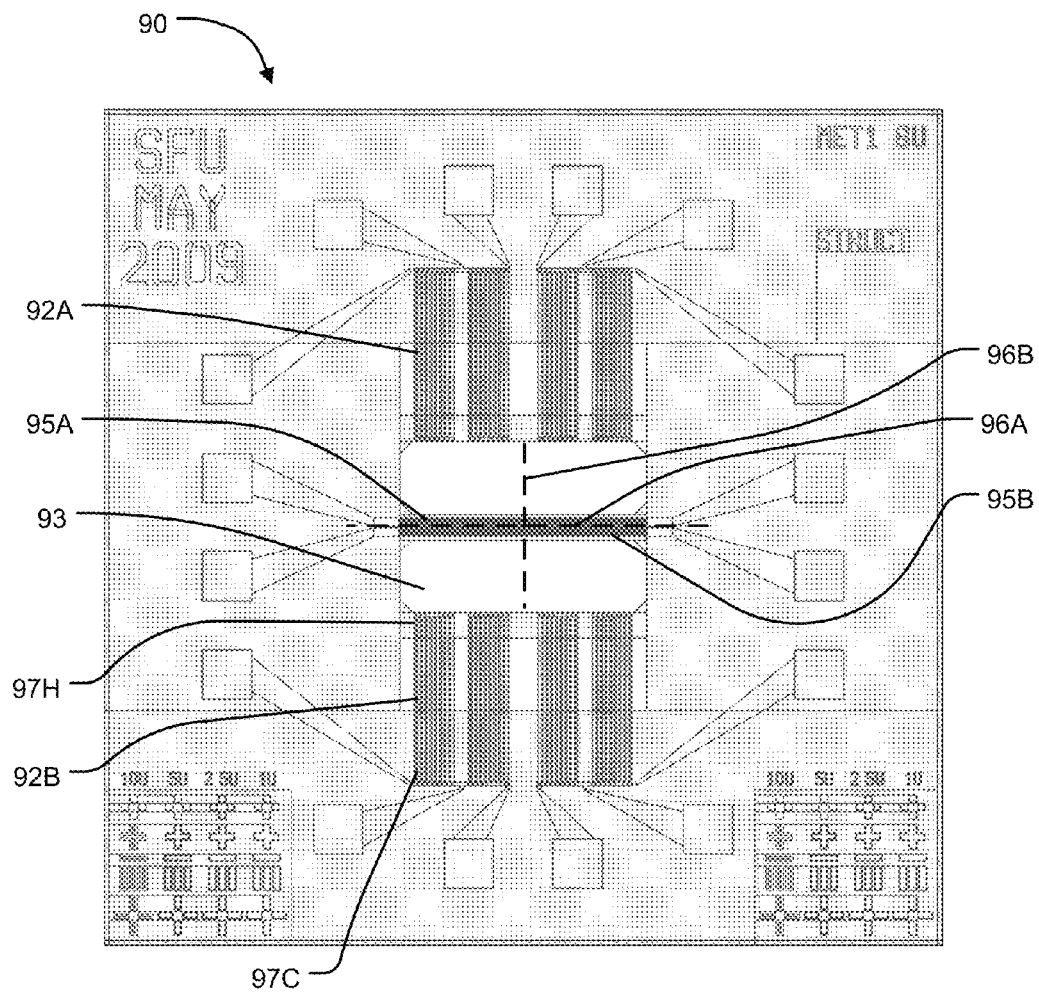
FIG. 9 shows an angular rate sensing apparatus comprising thermocouples for monitoring deflections of fluid streams.

Some examples of temperature sensors that may be applied to monitoring the trajectory of fluid flows are resistive temperature sensors, thermistors, semiconductor temperature sensors and thermocouples. FIG. 9 shows apparatus 90 comprising thermocouples 92A and 92B (collectively thermocouples 92) arranged for detecting differences in temperature between the sides of a channel 93. Heaters 95A and 95B are spaced apart along channel 93. Apparatus 90 is symmetrical about a symmetry axis 96A extending along the center of channel 93 and another symmetry axis 96B extending perpendicularly to symmetry axis 96A midway between heaters 95A and 95B.

Thermocouples 92 each comprise a plurality of series-connected thermocouple elements with hot junctions 97H projecting into channel 93 and cold junctions 97C away from channel 93. Cold junctions 97C may be in thermal contact with a substrate in which channel 93 is formed. In some embodiments, thermocouples 92A and 92B are connected in series such that the voltage across the series-connected thermocouples is representative of the temperature difference across channel 93.

The sensitivity of a detector as described herein can also be increased by increasing the mass within the moving streams of fluid. In some embodiments, this is achieved by using a high molecular weight gas as the fluid. For example, Sulfur Hexafluoride ($SF_6$) is used in some embodiments. $SF_6$ has a molecular weight of 146. In some embodiments the fluid comprises a gas having a molecular weight of at least 100. In some embodiments the fluid is pressurized to a pressure in excess of atmospheric pressure. Apparatus as described herein may comprise a sealed volume (for example, the interior of a chip package) filled with $SF_6$ or another suitable gas.

Figure 10:
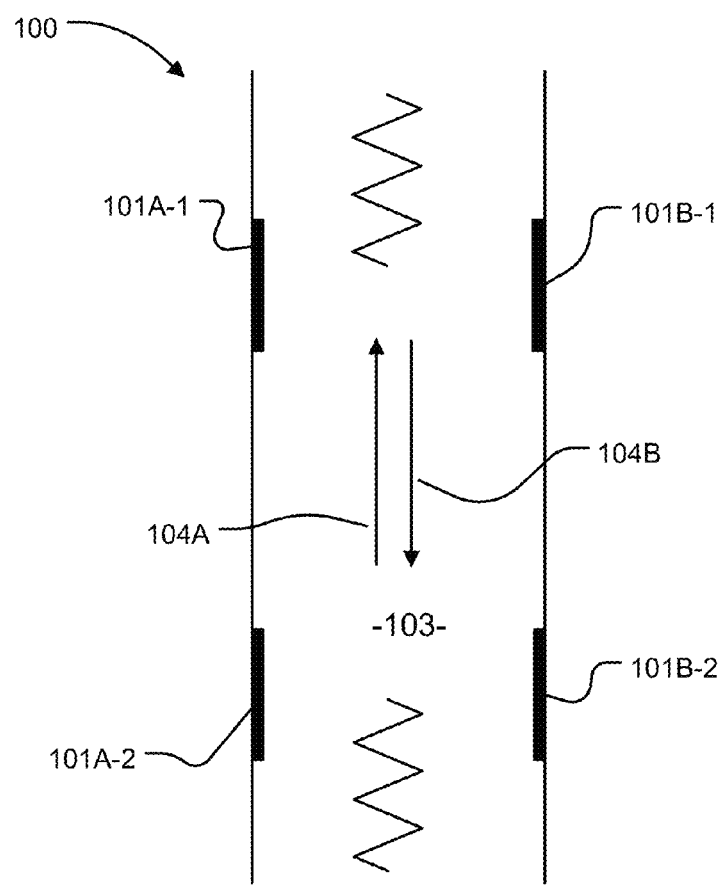
FIG. 10 shows an angular motion sensor comprising multiple temperature sensors on each side of a channel.

A wide range of variations is possible in the practice of the invention. For example, in some embodiments, a plurality of temperature sensors are provided along each side of an area in which a fluid flow is generated. FIG. 10 shows an angular rate sensor 100 comprising temperature sensors 101A-1 and 101A-2 arranged along a first side of a cavity 103 and temperature sensors 101B-1 and 101B-2 arranged along a second side of cavity 103. In some embodiments, each temperature sensor on one side of cavity 103 is paired with a corresponding temperature sensor on the opposite side of cavity 103 and differences are determined between the temperatures sensed by each pair of temperature sensors.

In some embodiments, one pair of temperature sensors 101 may be used when fluid is flowing on one direction and another pair of temperature sensors 101 may be used when the fluid is flowing in the opposite direction. For example, in embodiments like that illustrated in FIG. 10, temperature sensors 101A-1 and 101B-1 may be used when fluid is flowing in direction 104A and temperature sensors 101A-2 and 101B-2 may be used when fluid is flowing in direction 104B.

In some such embodiments, a pair of temperatures sensors are connected in series such that a signal provided by the series-connected temperature sensors is representative of the relative fluid flow on either side of a channel. In some such embodiments, a pair of temperature sensors at one end of the channel is connected in a polarity that is reversed relative to that of a pair of series-connected temperature sensors at another end of the channel.

It is not mandatory that only one heater is provided at each end of a channel. In some embodiments, a larger number of heaters may be provided. In some embodiments the heaters at each end of a channel may be energized in a sequence so as to enhance the speed of a stream of fluid in the channel.

Figure 11:
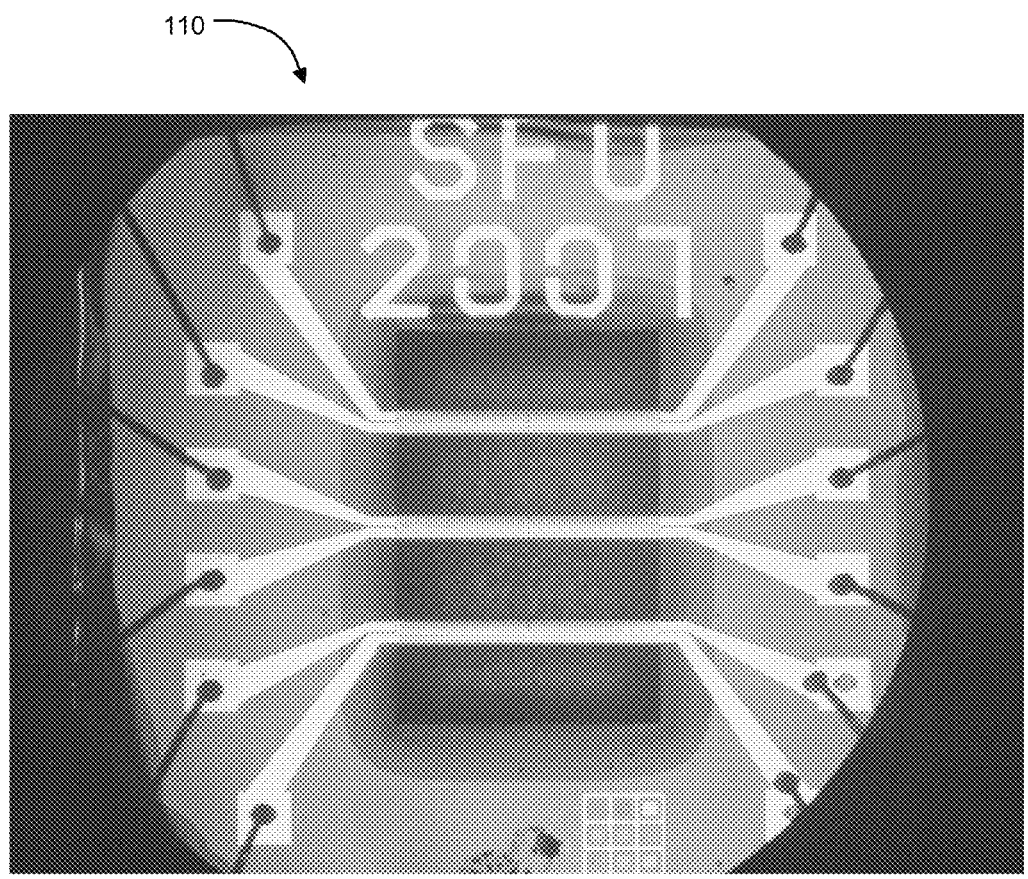
FIG. 11 is a microphotograph showing a prototype angular rate sensor.

FIG. 11 shows a prototype angular rate sensor 110 according to an embodiment of the invention. Angular rate sensor 110 is micromachined in a silicon substrate. The dimensions of various parts of angular rate sensor 110 are listed in Table I.

TABLE I

Dimensions of Prototype Sensor 110

| | |
|---|---|
| Depth of Channel (μm) | 300 |
| Width of Channel (μm) | 1500 |
| Length of Channel (μm) | 1000 |
| Distance between temperature sensors across channel (μm) | 800 |

In the illustrated prototype embodiment the temperature sensors comprise resistive temperature sensors supported on bridges which span the cavity. Such resistive temperature sensors may be connected in a bridge configuration to provide differential temperature measurement with good sensitivity.

Figure 12:
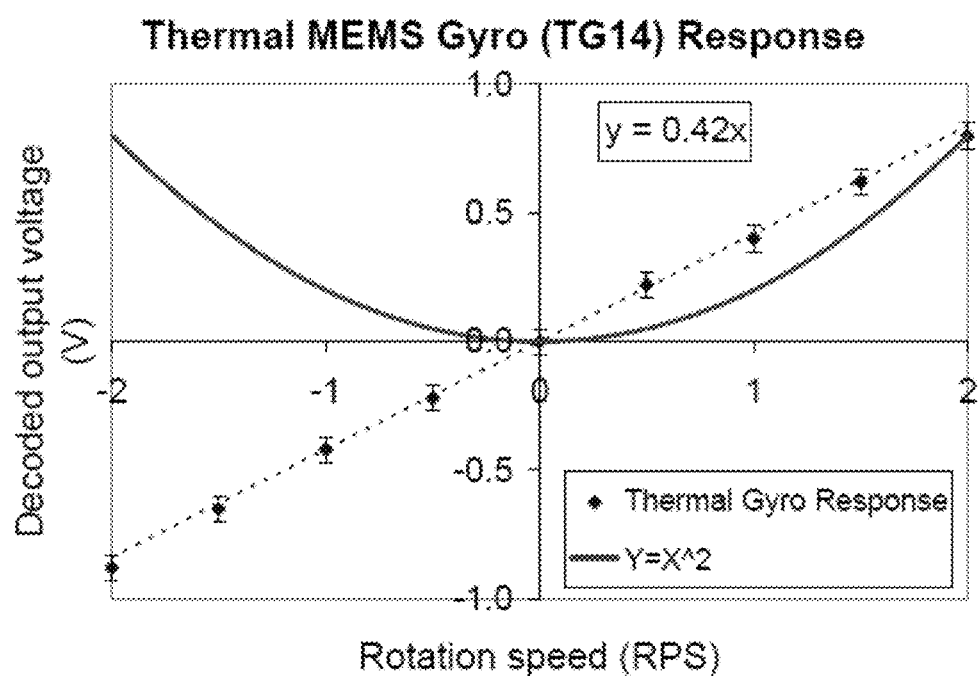
FIG. 12 shows output of an angular rate sensor like that of FIG. 11 as a function of rotation speed.

FIG. 12 shows output of the prototype sensor as a function of rotation speed (in rotations per second). The fluid filling the channel of the prototype device was $SF_6$. It can be seen that the prototype device output changes essentially linearly with rotational speed.

An advantage of some embodiments is that critical tolerances need not be maintained for proper operation. For example, in manufacturing an angular rate sensor like prototype sensor 110 comprising a cavity, the manufacturing process may control cavity dimensions to a resolution of plus or minus a few microns while still yielding angular rate sensors with acceptable performance. As a consequence, such sensors may be fabricated very inexpensively as compared to sensors of other types which require much tighter control over manufacturing tolerances.

Figure 13:
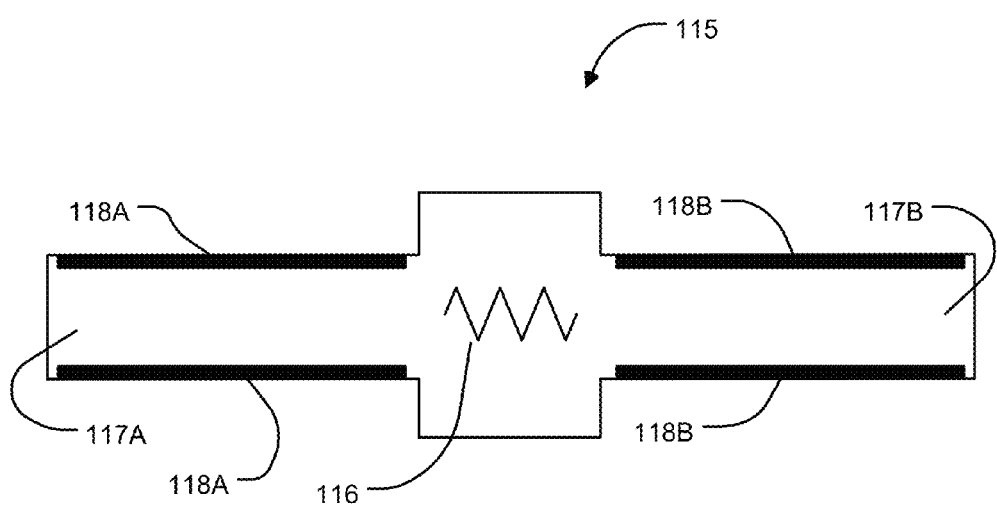
FIG. 13 shows an angular rate sensor according to another embodiment wherein a single heater is provided between two channel sections.

FIG. 13 shows an angular rate sensor 115 according to another embodiment wherein a single heater 116 is provided between two channel sections 117A and 117B. Heater 116 is turned ON periodically to generate opposed streams of fluid in each of channel sections 117A and 117B. Temperature sensor pairs 118A and 118B are provided to measure temperature differentials across channel sections 117A and 117B respectively at locations spaced apart from heater 116.

Multiple angular rotation sensors as described herein may be mounted in different orientations to permit detection of rotation about multiple axes. The rotation sensors may be mounted in multiple packages or in a common package. For example, some such angular rotation sensors may be supported out of a plane of a substrate in a manner as described in PCT patent application No. PCT/CA2007/001723 published as WO 2008/052306 entitled Three-Dimensional Microstructures and Methods for Making Same, which is hereby incorporated herein by reference.

Figure 14:
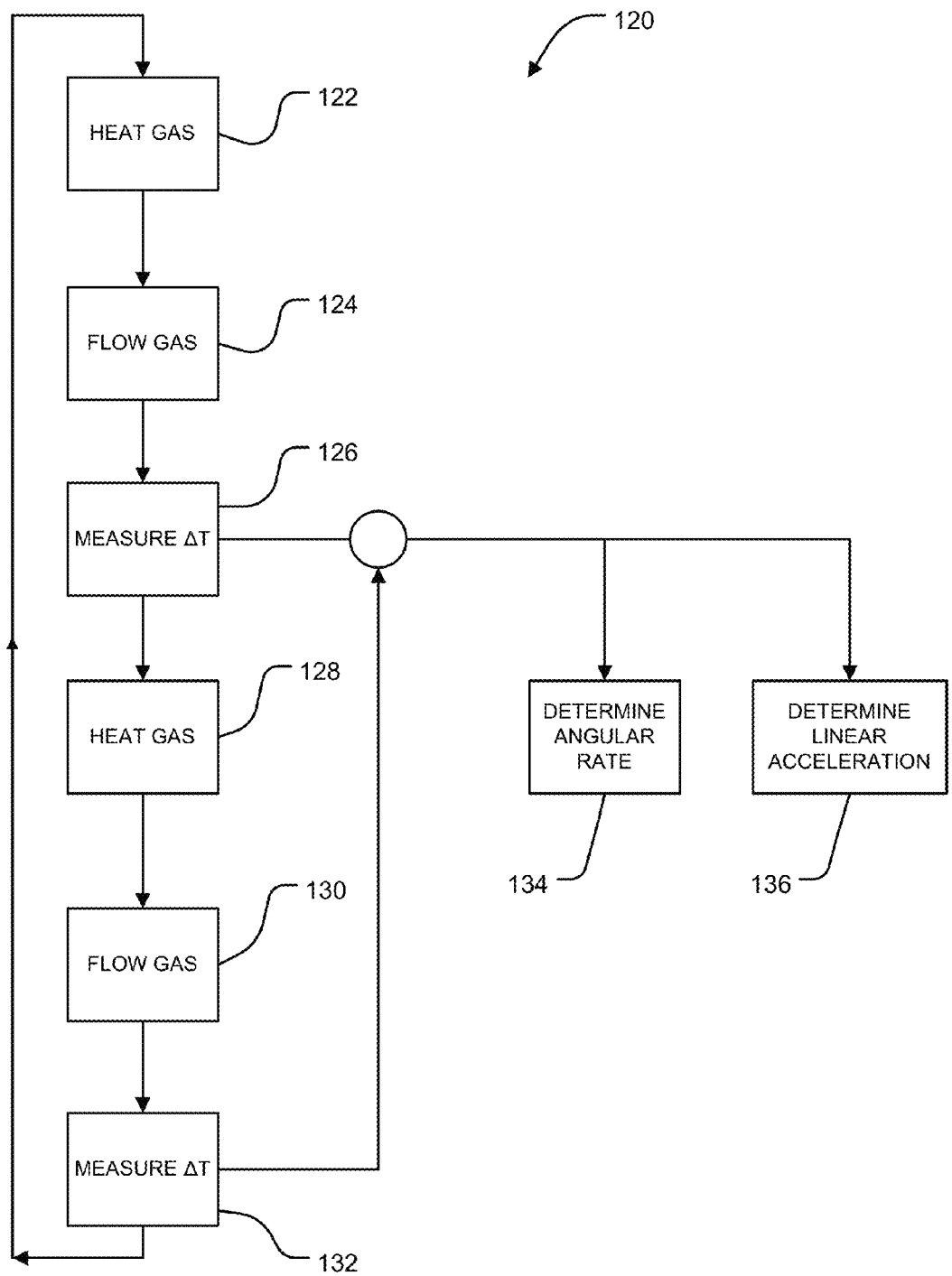
FIG. 14 is a flow chart illustrating a method for sensing rotation according to an example embodiment of the invention.

FIG. 14 illustrates a method 120 according to an embodiment of the invention. In block 122 a gas is heated in a first area. In block 124 the heated gas expands and causes a first flow of gas along a channel. In block 126 a temperature difference across the channel is measured at an area spaced apart from the first area. In block 128 the gas is heated in a second area spaced apart from the first area. In block 130 the gas heated in block 128 expands and causes a second flow of gas along the channel in a direction opposite to the first flow. In block 132 a temperature difference across the channel is measured at an area spaced apart from the second area. In block 134 a measure of angular rate and/or direction is determined from the temperature differences of blocks 126 and 132.

In optional block 136 a measure of linear acceleration is determined based on the temperature differences measured in blocks 126 and 132. Block 136 may comprise, for example, summing and filtering the temperature differences of blocks 126 and 132.

Figure 15:
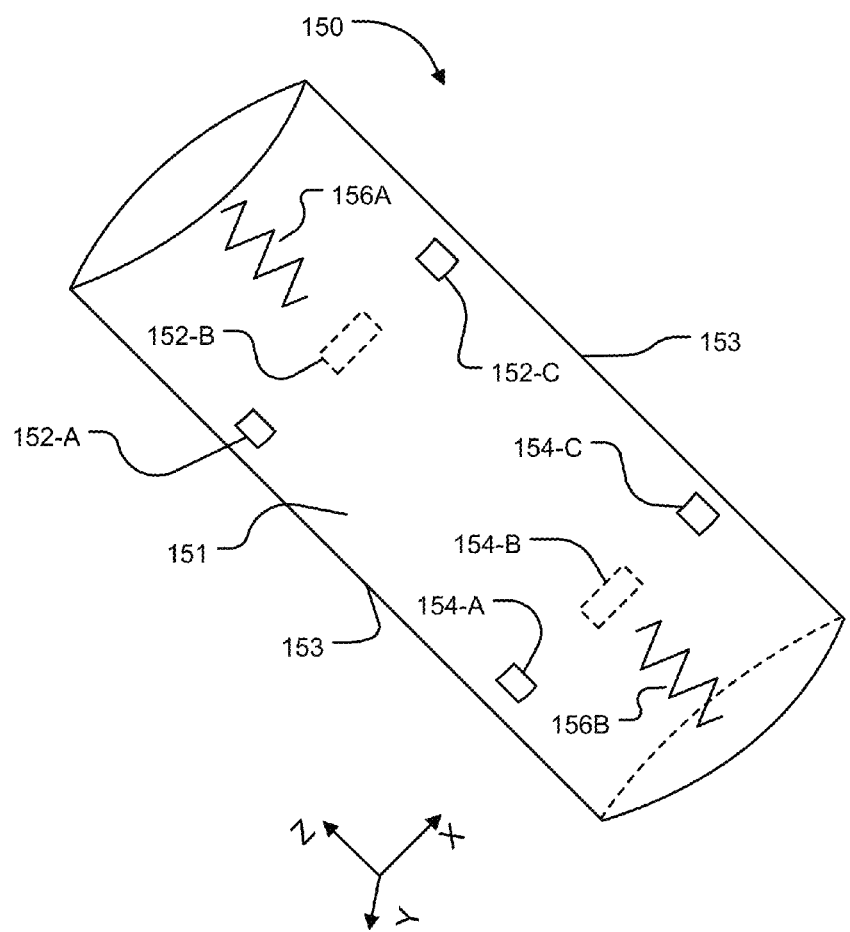
FIG. 15 shows an angular rate sensor according to another example embodiment that is configured to measure angular rotation components in two planes.

FIG. 15 illustrates an angular rate sensor 150 according to an alternative embodiment. Channel 151 is enclosed by walls 153. Heaters 156A and 156B heat a fluid in channel 151 in alternation to induce a flow that alternates in direction, as described in other embodiments above. Sets of temperature sensors 152 and 154 detect the effects of Coriolis forces in two planes. Temperature sensors 152A, 152B, and 152C are positioned to detect temperature differences arising from deflections of the trajectory of the fluid flow in two planes. Angular rates about axes perpendicular to each of the two planes and linear accelerations in the planes may be determined from differences between the temperatures monitored by temperature sensors 152.

Figure 16A:
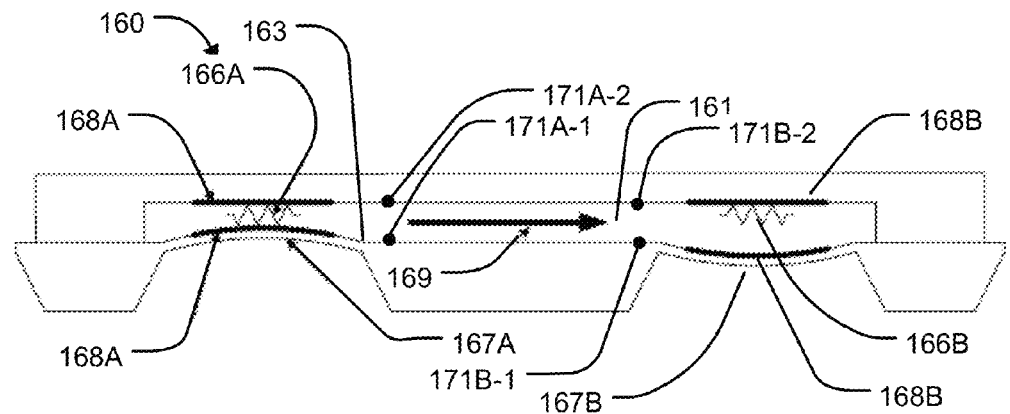
FIGS. 16A and 16B are partially-schematic cross-section views illustrating an angular rate sensor according to an embodiment comprising diaphragms that can be actuated to cause or augment alternating bi-directional fluid flow along a channel of the angular rate sensor.
Figure 16B:
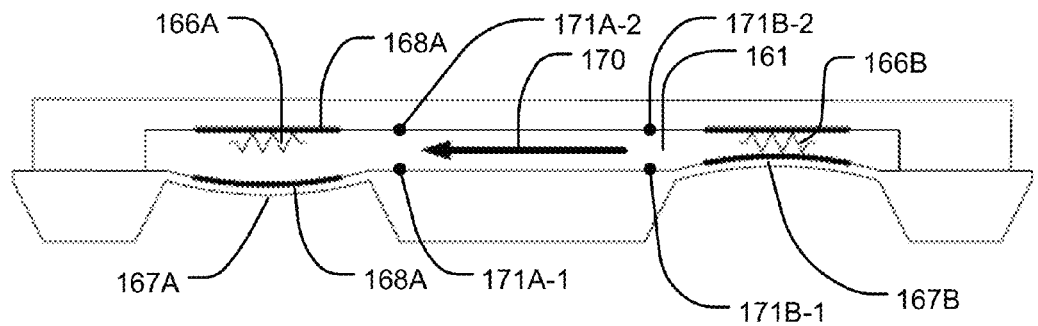

As mentioned above, the sensitivity of an angular rate detector as described herein typically increases with increased fluid velocity. Some embodiments comprise mechanisms to increase the velocity of the alternating flow in a device as described herein. FIGS. 16A and 16B show an example angular rate sensor 160 according to one such embodiment. Angular rate sensor 160 comprises a channel 161 that is enclosed by walls 163. Heaters 166A and 166B heat a fluid in channel 161 in alternation to induce a flow that alternates in direction, as described in other embodiments above. Diaphragms 167A and 167B are provided in channel walls 163. Diaphragms 167A and 167B are driven by suitable electromechanical actuators such as piezoelectric actuators or electrostatic actuators.

As can be seen by comparing FIGS. 16A and 16B, diaphragms 167A and 167B may be driven out-of-phase with one another (i.e. deflected in opposite directions) so as to push fluid back and forth within channel 161. Diaphragms 167 may be used in conjunction with heaters 166 or optionally without heaters 166 to cause fluid to flow back and forth within channel 161.

Where diaphragms 167 are used together with heaters 166 then a first diaphragm 167A at a first end of channel 161 may be deflected inwardly with respect to channel 161 while operating an adjacent heater 166A. This both causes fluid at the first end of channel 161 to expand and reduces the volume of the first end of channel 161. At the same time, a diaphragm 167B at a second end of channel 161 may be deflected outwardly relative to channel 161 while a heater 166B at the second end of channel 161 is turned off or down. This causes an increase in the volume of the second end of channel 161. The operation of diaphragms 167 thereby accelerates the fluid flowing from the first to second end of channel 161 as indicated by arrow 169.

Figure 16C:
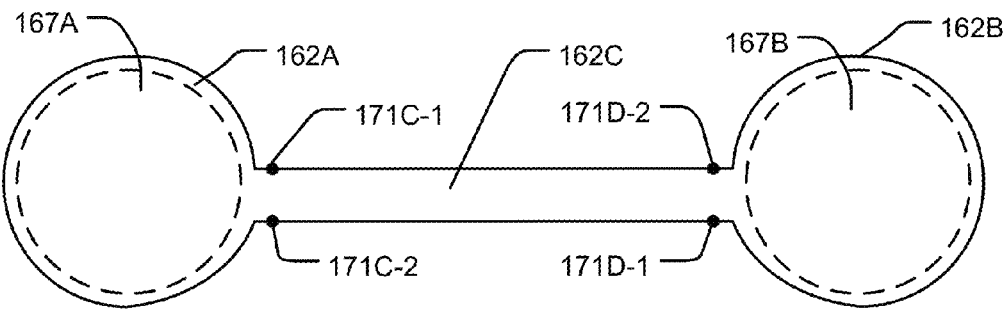
FIG. 16C is a partially-schematic top plan view of the angular rate sensor of FIGS. 16A and 16B.

As shown in FIG. 16C the areas of diaphragms 167 may be made large relative to the cross-sectional area of the portion of channel 161. In the embodiment illustrated in FIG. 16C channel 161 comprises a relatively narrow portion 162C that connects chambers 162A and 162B that are each bounded on one side by a corresponding one of diaphragms 167. In some embodiments, each of chambers 162A and 162B is bounded on two opposing faces by opposing diaphragms 167.

In the illustrated embodiment, diaphragms 167 are electrostatically operated by applying charges to plates 168. Plates 168A are provided to drive diaphragm 167A and plates 168B are provided to drive diaphragm 167B. Diaphragms 167 may be drawn inwardly by applying unlike charges to plates 168. Diaphragms 167 may be pushed outwardly inwardly by applying like charges to plates 168.

Temperature sensors 171B-1 and 171B-2 detect deflection of flowing fluid 169 that reaches the second end of channel 161.

As shown in FIG. 16B, turning on heater 167B, turning off heater 167A and deflecting diaphragm 167B inward relative to channel 161 while deflecting diaphragm 167A outward relative to channel 161 can cause fluid flow 170 in a direction opposite to fluid flow 169. Temperature sensors 171A-1 and 171A-2 detect deflection of flowing fluid 170 that reaches the first end of channel 161.

Additional or alternative temperature sensors may be provided to detect deflections of flowing fluid 169 and/or 170 out of or into the plane of FIGS. 16A and 16B. For example, temperature sensors 171C-1, 171C-2, 171D-1, and 171D-2 are shown in FIG. 16C.

Where a component (e.g. a temperature sensor, heater, circuit, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, features of different ones of the example embodiments described above may be combined with one another to yield further embodiments. Accordingly, the scope of the invention is to be construed in accordance with the substance defined by the following claims.

What is claimed is:

1. A sensor for detecting angular motion, the sensor comprising:
    a channel,
    first and second fluid drivers located at first and second ends of the channel,
    a driving circuit operative to actuate the first and second fluid drivers to, in alternation, drive a first stream of fluid to flow along the channel in a first direction and drive a second stream of fluid to flow along the channel in a second direction opposite to the first direction, and
    a trajectory sensor configured to detect variations in trajectories of the first and second streams of fluid.

2. A sensor according to claim 1 wherein the trajectory sensor comprises first and second temperature sensors on opposing sides of the channel and the first and second streams are directed to flow between the first and second temperature sensors.

3. A sensor according to claim 2 wherein the temperature sensors comprise temperature sensors of first and second mass flow sensors.

4. A sensor according to claim 2 wherein the first and second fluid drivers comprise first and second heaters.

5. A sensor according to claim 4 comprising a control circuit configured to operate the first and second heaters in alternation.

6. A sensor according to claim 5 comprising a difference circuit connected to receive output signals from the first and second temperature sensors and to generate a difference signal.

7. A sensor according to claim 6 comprising an inverter connected to invert the difference signal to yield an inverted difference signal and a switch controlled by the control circuit, the switch operative to switch between selecting the difference signal and selecting the inverted difference signal in time with the alternation of operation of the first and second heaters.

8. A sensor according to claim 4 wherein the first and second fluid drivers respectively further comprise one or more first deflectable members located at the first end of the channel and one or more second deflectable members located at the second end of the channel.

9. A sensor according to claim 8 wherein the first and second deflectable members comprise diaphragms operated by electromechanical actuators.

10. A sensor according to claim 1 wherein the first and second fluid drivers respectively comprise first and second deflectable members.

11. A sensor according to claim 10 wherein the first and second deflectable members comprise diaphragms operated by electromechanical actuators.

12. A sensor according to claim 4 comprising a flow divider located in the channel, the flow divider dividing the channel into symmetrical first and second paths such that the first and second temperature sensors lie on either side of a plane of symmetry of the flow divider.

13. A sensor according to claim 2 wherein the first and second temperature sensors each comprise a plurality of temperature sensing elements.

14. A sensor according to claim 13 wherein the first and second temperature sensors each include at least one temperature sensing element at the first end of the channel and at least one temperature sensing element at the second end of the channel.

15. A sensor according to claim 1 wherein the channel is filled with a gas having a molecular weight of at least 100.

16. A sensor according to claim 15 wherein the gas comprises SF6.

17. A sensor according to claim 15 wherein the channel comprises a sealed volume.

18. A sensor according to claim 1 wherein the trajectory sensor is a first trajectory sensor configured to detect the variations in trajectories of the first and second streams of fluid in a first plane and the sensor further comprises a second trajectory sensor configured to detect the variations in trajectories of the first and second streams of fluid in a second plane that is at right angles to the first plane.

19. A method for detecting angular rate, the method comprising:
    in alternation generating a first stream of fluid flowing in a channel in a first direction and generating a second stream of fluid flowing in the channel in a second direction opposed to the first direction;
    measuring deviations in trajectories of the first and second streams; and
    combining the deviations to provide a measure of the angular rate and/or a measure of linear acceleration.

20. A method according to claim 19 wherein generating the first and second streams respectively comprise operating first and second heaters.

* * * * *